(12) United States Patent
Takakura et al.

(10) Patent No.: US 7,856,117 B2
(45) Date of Patent: Dec. 21, 2010

(54) IMAGE PROCESSING APPARATUS

(75) Inventors: Hiroyuki Takakura, Sagamihara (JP); Jun Moroo, Kawasaki (JP); Hirotaka Chiba, Kawasaki (JP); Tsugio Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1361 days.

(21) Appl. No.: 11/320,449

(22) Filed: Dec. 29, 2005

(65) Prior Publication Data
US 2006/0274379 A1 Dec. 7, 2006

(30) Foreign Application Priority Data
Jun. 2, 2005 (JP) .............................. 2005-162813

(51) Int. Cl.
*G06K 9/00* (2006.01)
(52) U.S. Cl. ....................................... 382/100; 713/176
(58) Field of Classification Search ................. 382/100, 382/232, 236–242; 380/210, 252, 287, 54; 713/176; 704/200.1, 273; 381/73.1; 348/460
See application file for complete search history.

(56) References Cited

U.S. PATENT DOCUMENTS

| | | | | |
|---|---|---|---|---|
| 6,285,776 | B1 * | 9/2001 | Rhoads | 382/100 |
| 6,490,681 | B1 * | 12/2002 | Kobayashi et al. | 713/171 |
| 6,553,129 | B1 * | 4/2003 | Rhoads | 382/100 |
| 6,580,804 | B1 * | 6/2003 | Abe | 382/100 |
| 2001/0030759 | A1 * | 10/2001 | Hayashi et al. | 358/1.9 |
| 2003/0142848 | A1 | 7/2003 | Wendt | |
| 2004/0014460 | A1 | 1/2004 | Moroo et al. | |
| 2004/0042670 | A1 | 3/2004 | Moroo et al. | |
| 2005/0117774 | A1 * | 6/2005 | Moroo et al. | 382/100 |

FOREIGN PATENT DOCUMENTS

| | | |
|---|---|---|
| JP | 7-254037 | 10/1995 |
| JP | 11-75053 | 3/1999 |
| JP | HEI 11-187245 A | 7/1999 |
| JP | 2001-197303 | 7/2001 |
| JP | 2002-354221 | 12/2002 |
| JP | 2004-56356 A | 2/2004 |
| JP | 2005-26797 | 1/2005 |
| JP | 2004-94551 A | 3/2005 |
| JP | 2005-167316 A | 6/2005 |
| JP | 2004-349879 A | 12/2005 |

OTHER PUBLICATIONS

U.S. Appl. No. 10/824,528, filed Apr. 2004, Jun Moroo, Fujitsu Limited.

(Continued)

*Primary Examiner*—Anand Bhatnagar
(74) *Attorney, Agent, or Firm*—Staas & Halsey LLP

(57) ABSTRACT

An apparatus that embeds data in an image includes a mark embedding unit that embeds a feature that forms a predetermined pattern in the image, as a mark to be used to specify an area in which the data is embedded, and a data embedding unit that embeds the data in the image of the area specified by the mark.

7 Claims, 20 Drawing Sheets

OTHER PUBLICATIONS

U.S. Appl. No. 10/962,512, filed Oct. 2004, Jun Moroo, Fujitsu Limited.

Office Action issued in corresponding Japanese Patent Application No. 2005-162819, mailed on Sep. 25, 2007.

European Search Report mailed Aug. 29, 2006 issued in corresponding European Application No. EP 05113106.

"Fast Robust Template Matching for Affine Resistant Image Watermarks", Shelby Pereira et al., Internal Workshop on Information Hiding, Sep. 29, 1999-Oct. 1, 1999, pp. 1-12.

"Image and Watermark Registration for Monochrome and Coloured Images", C.F. Osborne, et al., Digital Image Computing, Technology and Applications, 1997, pp. 55-64.

* cited by examiner

POSITIVE INFLECTION POINT

CENTER OF AREA

POSITIVE INFLECTION POINT

CENTER OF AREA

FIG.7
NEGATIVE INFLECTION POINT
CENTER OF AREA
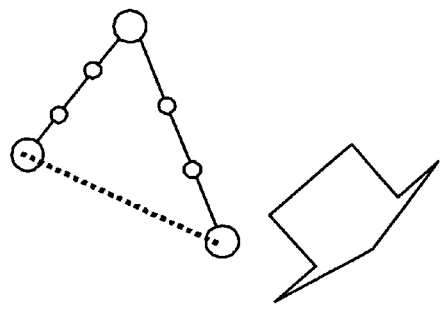
NEGATIVE INFLECTION POINT IS BLACK
EMBED AS PATTERN LAYOUT
※ ADD TWO-DIMENSIONAL VALUES
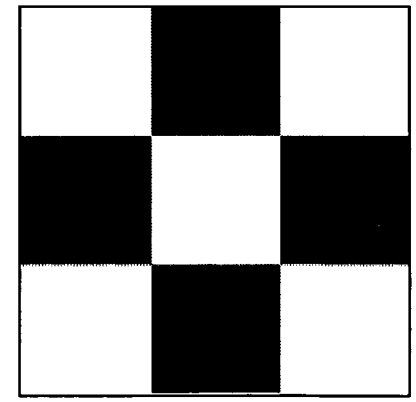
POSITIVE INFLECTION POINT
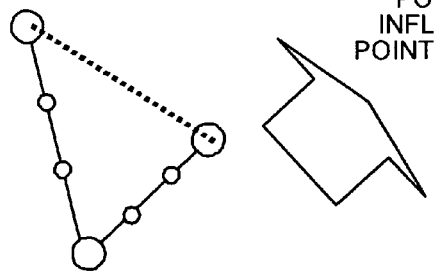
POSITIVE INFLECTION POINT IS WHITE
CENTER OF AREA

FIG.8A
PATTERN OF POSITIVE AND NEGATIVE
INVERTED PATTERN FROM FIG. 7
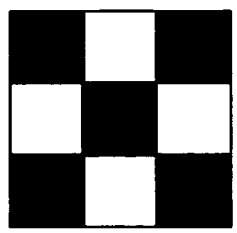
FIG.8B
CONCENTRIC PATTERN
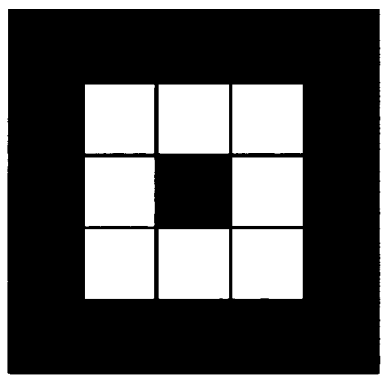
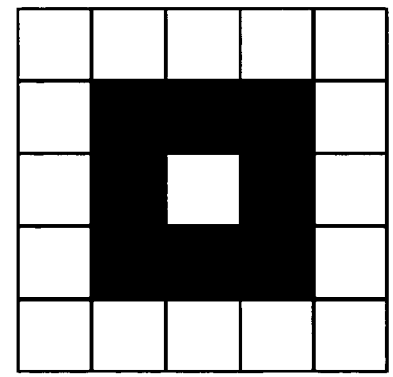

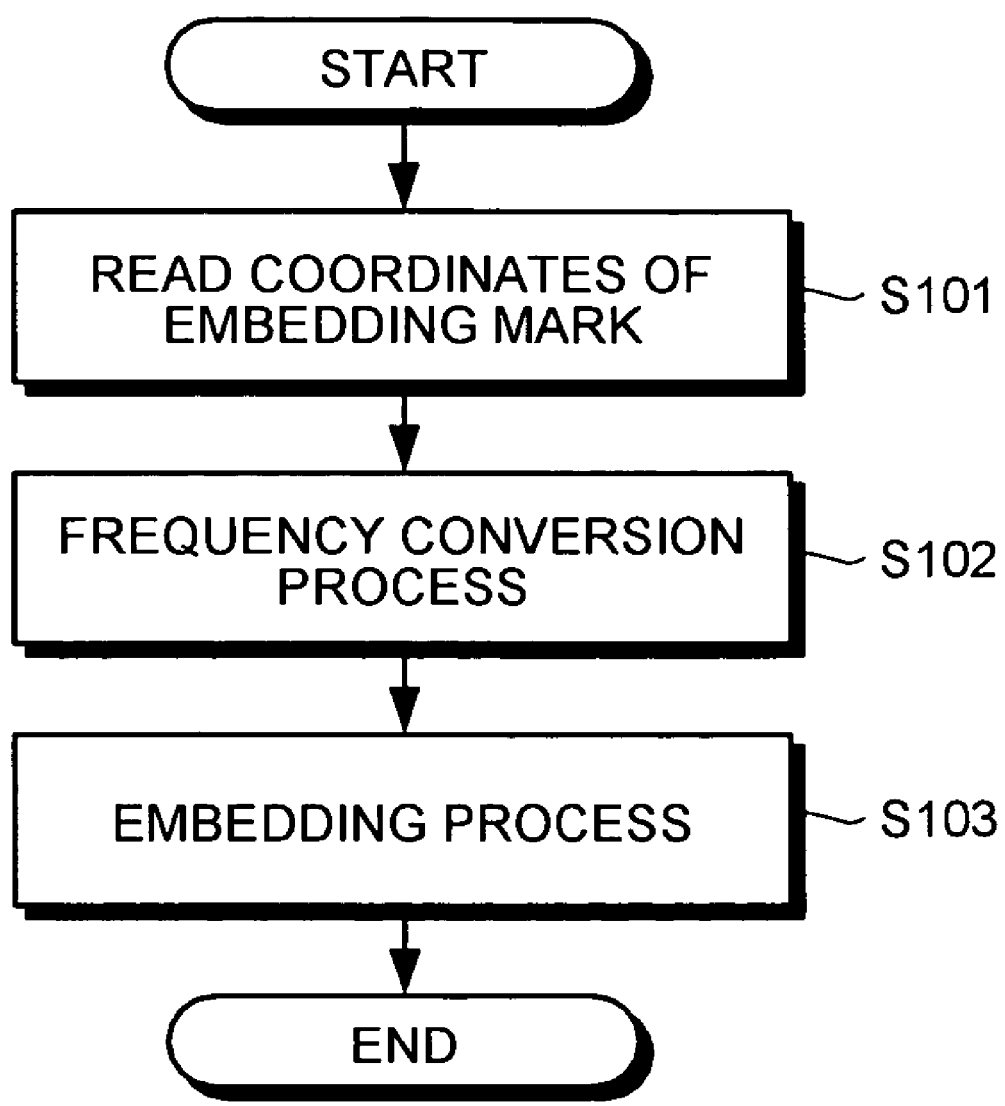

WHEN SHAPE OF DATA-EMBEDDED AREA IS TRIANGLE

WHEN SHAPE OF DATA-EMBEDDED AREA IS IRREGULAR

WHEN SHAPE OF DATA-EMBEDDED AREA IS CIRCLE

FIG.13
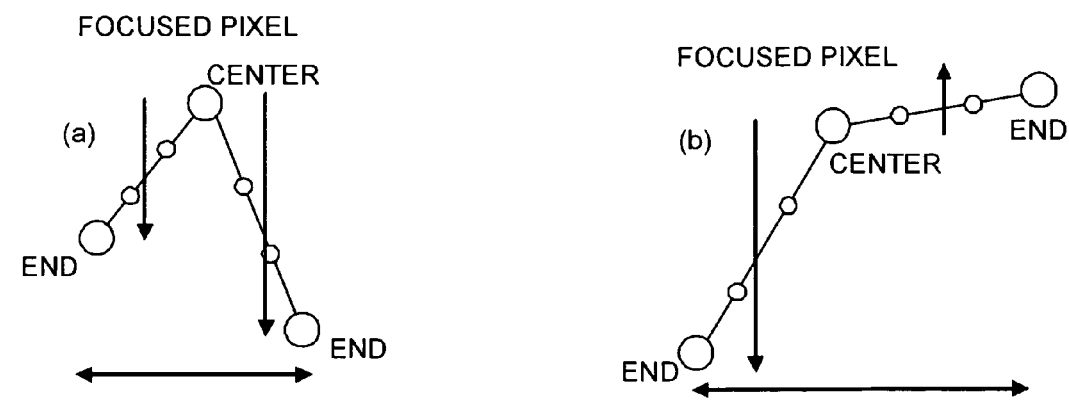
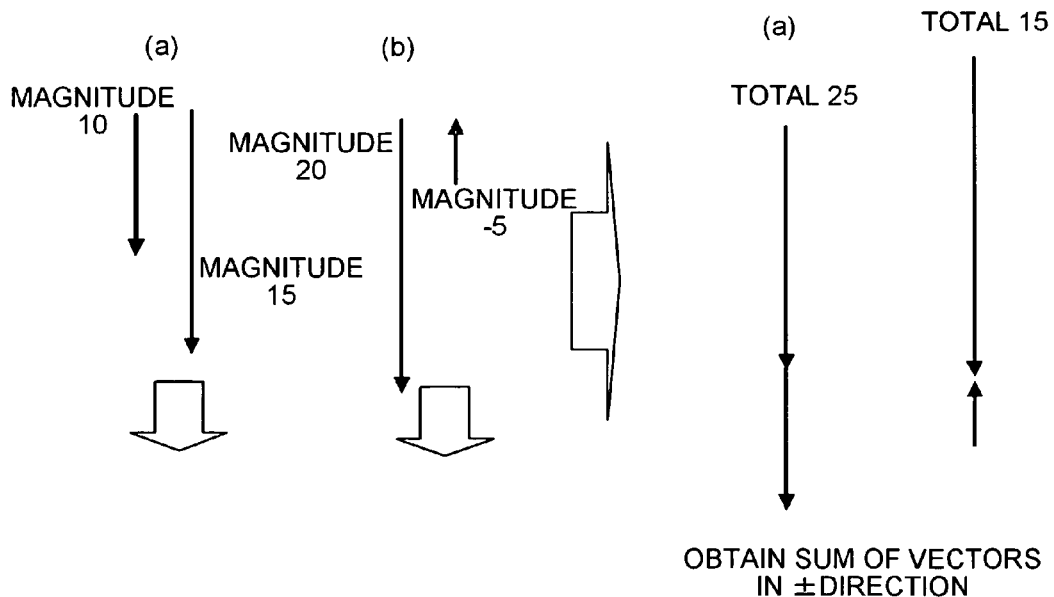

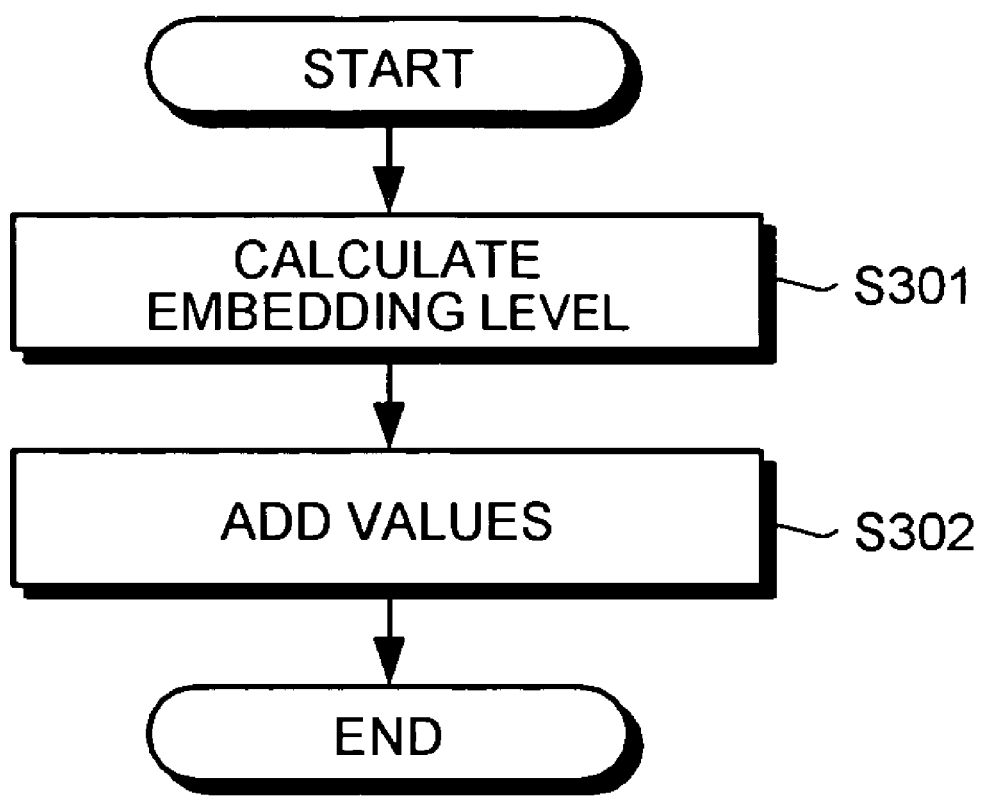

FIG.16
WHEN EMBEDDING NEGATIVE, POSITIVE, AND NEGATIVE INFLECTION POINTS FROM LEFT
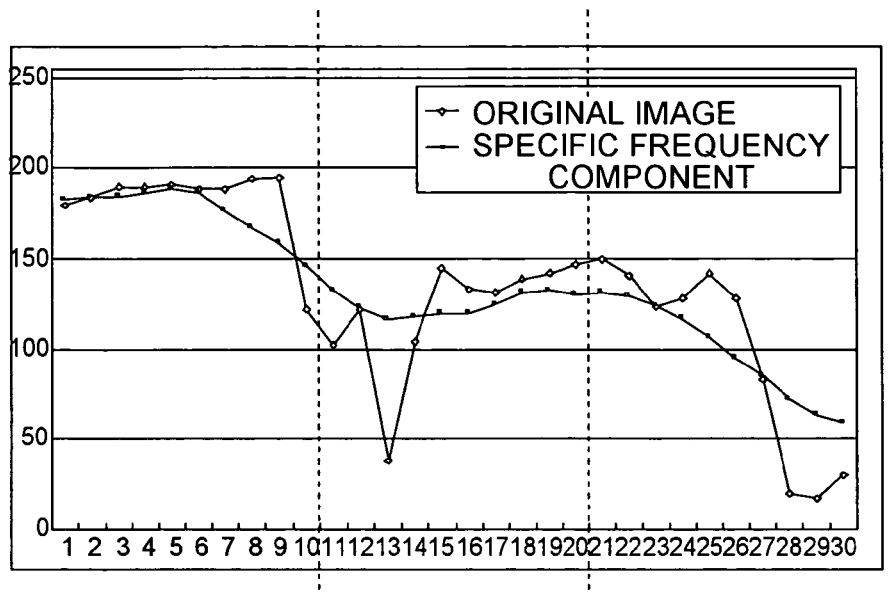
ADD NEGATIVE VALUE     ADD POSITIVE VALUE     UNCHANGED
NEGATIVE     POSITIVE     NEGATIVE
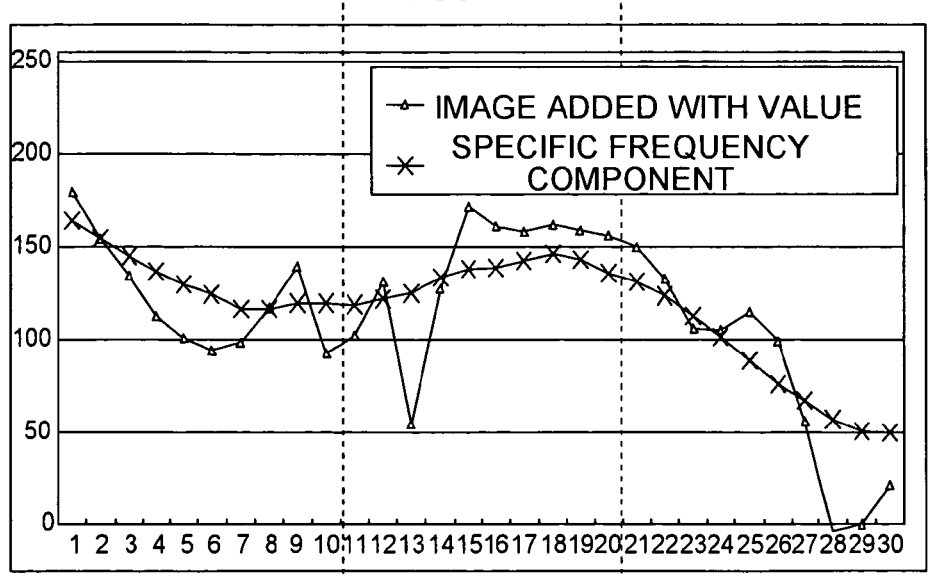

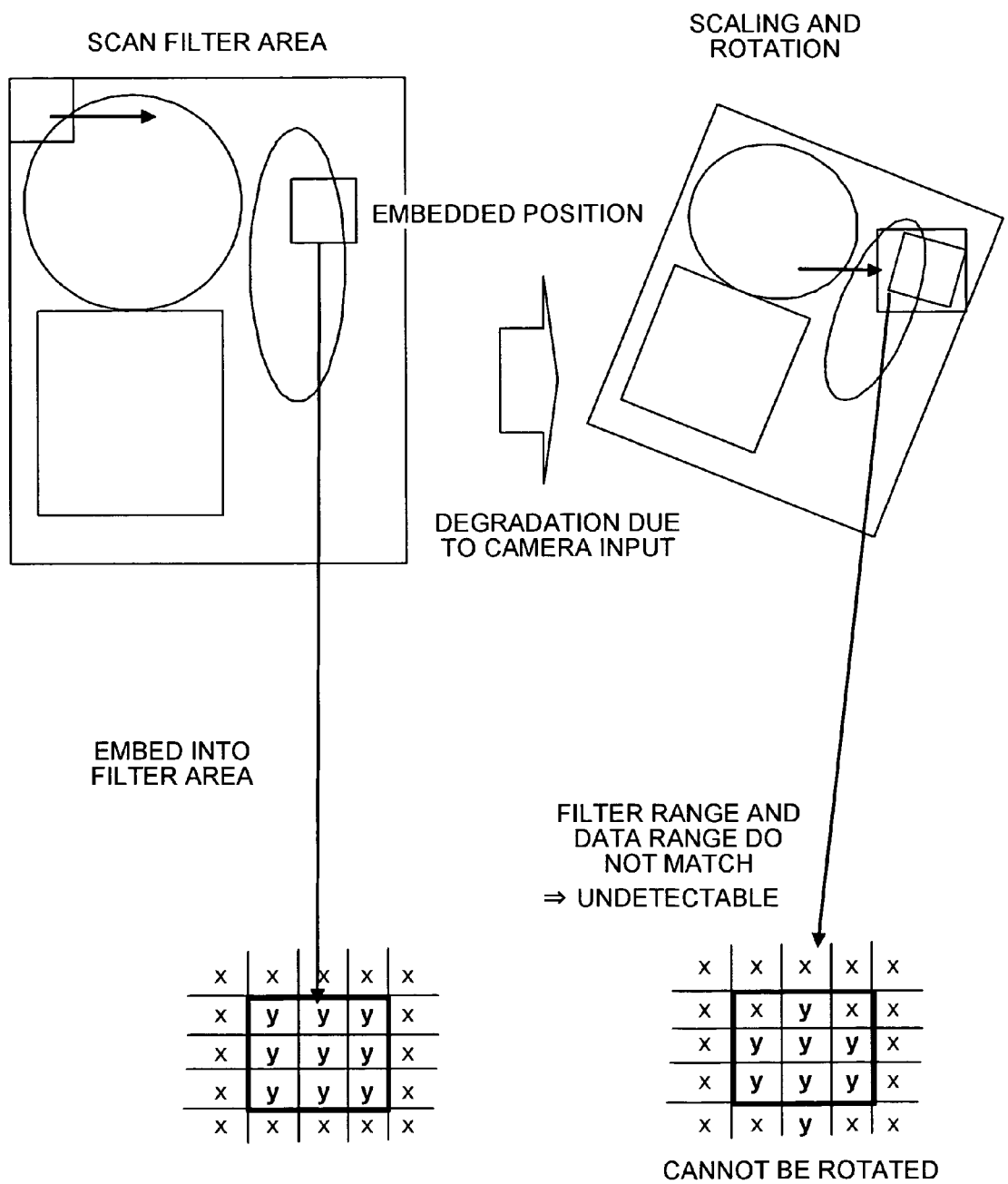

IMAGE PROCESSING APPARATUS

BACKGROUND OF THE INVENTION

1. Field of the Invention

The present invention relates to a technology for embedding data into an image and extracting embedded data from a printed image.

2. Description of the Related Art

Recently, an electronic watermark technique of embedding invisible data into image data has been actively developed. For example, Japanese Patent Application Laid-Open No. 2004-349879 discloses a technique of dividing image data into plural blocks, and embedding plural codes into the blocks by relating one code to each block based on a magnitude relation of characteristics of the block such as average concentration of the block.

Japanese Patent Application Laid-Open No. H11-187245 discloses a technique of scanning a total image using a filter of a constant size, embedding data at plural positions where a predetermined condition is satisfied, and extracting data by scanning the image using the same filter, thereby detecting the positions where the predetermined condition is satisfied, and extracting the data.

However, according to the conventional techniques, at a time of reading a printed image to extract data, the data cannot be extracted correctly due to a distortion of the image, such as an enlargement or reduction or a rotation of the image, at a time of reading the image.

FIG. 19 is a schematic for illustrating a problem occurring when an image is reduced and rotated. In FIG. 19, y denotes a pixel of an area in which data is embedded, and x denotes a pixel of another area. When the image is reduced and rotated, the area embedded with the data does not coincide with a filtered area at the time of extracting the data. Therefore, the data cannot be correctly extracted.

SUMMARY OF THE INVENTION

It is an object of the present invention to at least solve the problems in the conventional technology.

An apparatus that embeds data in an image, according to one aspect of the present invention, includes a mark embedding unit that embeds a feature that forms a predetermined pattern in the image, as a mark to be used to specify an area in which the data is embedded; and a data embedding unit that embeds the data in the image of the area specified by the mark.

A method of embedding data into an image, according to another aspect of the present invention, includes embedding a feature that forms a predetermined pattern in the image, as a mark to be used to specify an area in which the data is embedded; and embedding the data in the image of the area specified by the mark.

A computer-readable recording medium according to still another aspect of the present invention stores a computer program for embedding data in an image. The computer program causes a computer to execute embedding a feature that forms a predetermined pattern in the image, as a mark to be used to specify an area in which the data is embedded; and embedding the data in the image of the area specified by the mark.

An apparatus that extracts data embedded in an image, according to still another aspect of the present invention, includes a mark detecting unit that detects a mark embedded in the image as a predetermined pattern to specify an area in which the data is embedded; and a data extracting unit that extracts the data from the area specified based on the mark.

A method of extracting data embedded in an image, according to still another aspect of the present invention, includes detecting a mark embedded in the image as a predetermined pattern to specify an area in which the data is embedded; and extracting the data from the area specified based on the mark.

A computer-readable recording medium according to still another aspect of the present invention stores a computer program for extracting data embedded in an image. The computer program causes a computer to execute detecting a mark embedded in the image as a predetermined pattern to specify an area in which the data is embedded; and extracting the data from the area specified based on the mark.

A printed medium according to still another aspect of the present invention has an image data and a mark printed thereon. The image data is divided into a plurality of blocks. A code is embedded in an area of the image data based on a magnitude relation of a characteristic amount of each of the blocks between a pair of blocks. The mark is a feature forming a predetermined pattern in an image, to be used to specify the area in which the code is embedded area.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a schematic for illustrating embedding of marks as a symmetrical pattern of the inflection point;

FIGS. 8A and 8B are schematics for illustrating other symmetrical patterns;

FIG. 9 is a flowchart of a processing procedure performed by a mark embedding unit;

FIG. 13 is a schematic for illustrating a method of detecting an inflection point;

FIG. 15 is a flowchart of a processing procedure for a value adding process procedure;

FIG. 16 is a diagram for explaining an example of creating positive and negative inflection points in a specific frequency component by adding values;

FIG. 19 is a schematic for illustrating a problem occurring when an image is reduced and rotated.

DETAILED DESCRIPTION OF THE PREFERRED EMBODIMENTS

Exemplary embodiments of the present invention are explained in detail below with reference to the accompanying drawings.

Throughout the specification, an image processing apparatus that embeds data into an image is referred to as an encoder, and an image processing apparatus that extracts embedded data from an image is referred to as a decoder.

Figure 1:
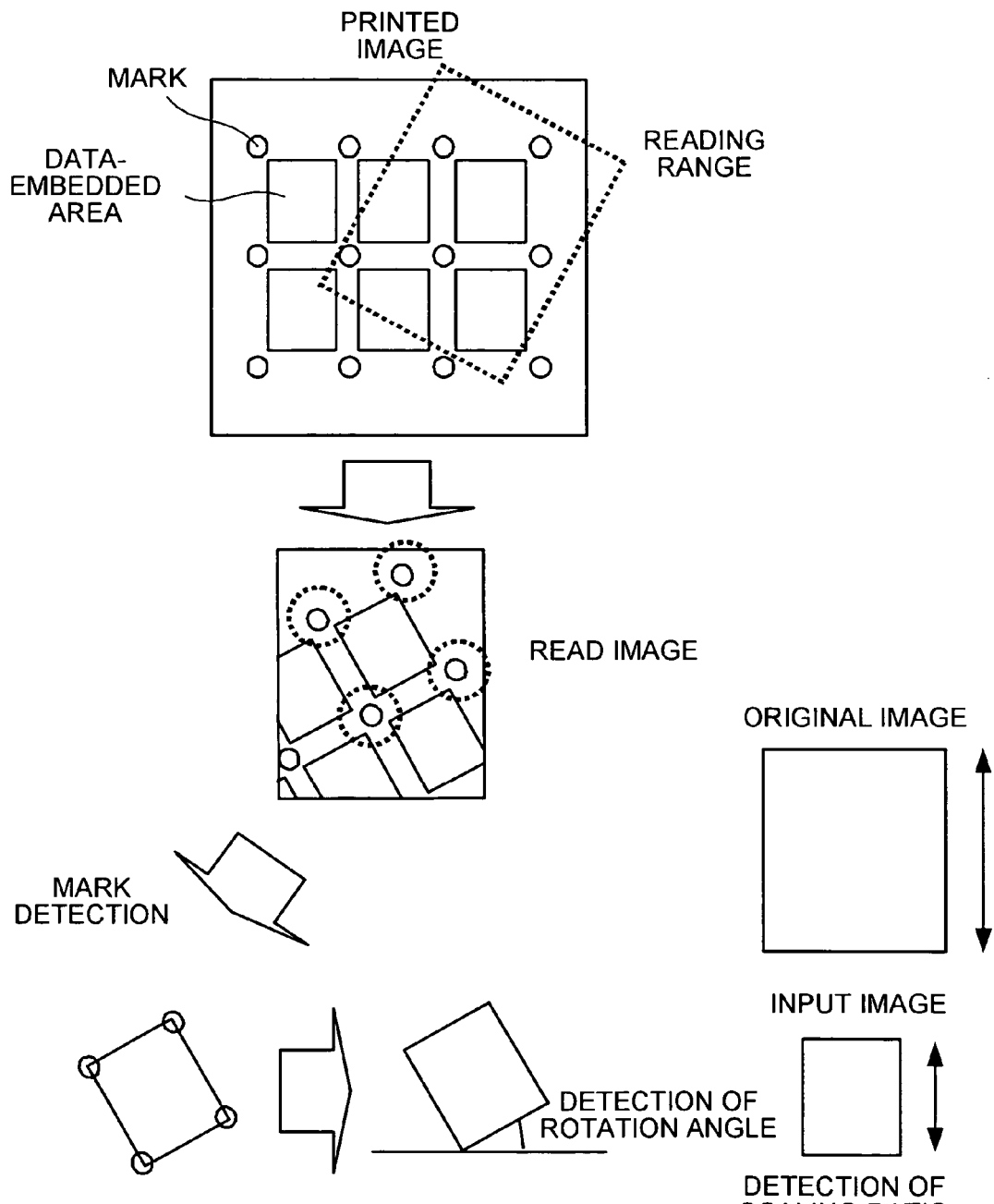
FIG. 1 is a schematic for illustrating a method of specifying a data-embedded area by an image processing apparatus according to an embodiment of the present invention.

FIG. 1 is a schematic for illustrating a method of specifying a data-embedded area by an image processing apparatus according to an embodiment of the present invention. An encoder embeds invisible marks into four areas that encircle a data-embedded area. The encoder embeds marks by changing a tone level of one of R, G, and B planes so that a result of transforming a wavelet of the tone level becomes a predetermined pattern of an inflection point.

At the time of extracting data, a decoder detects four marks from the read image, and detects an enlargement or reduction rate and a rotation angle of the data-embedded area from a positional relationship of these marks. The decoder specifies the data-embedded area by using the detected enlargement or reduction rate and the detected rotation angle.

According to the present embodiment, the encoder embeds marks for specifying a data-embedded area into an image. The decoder detects the marks embedded in the image, and detects an enlargement or reduction rate and a rotation angle of the read image. With this mechanism, it is possible to accurately specify the data-embedded area, and extract the embedded data with high precision.

Figure 2:
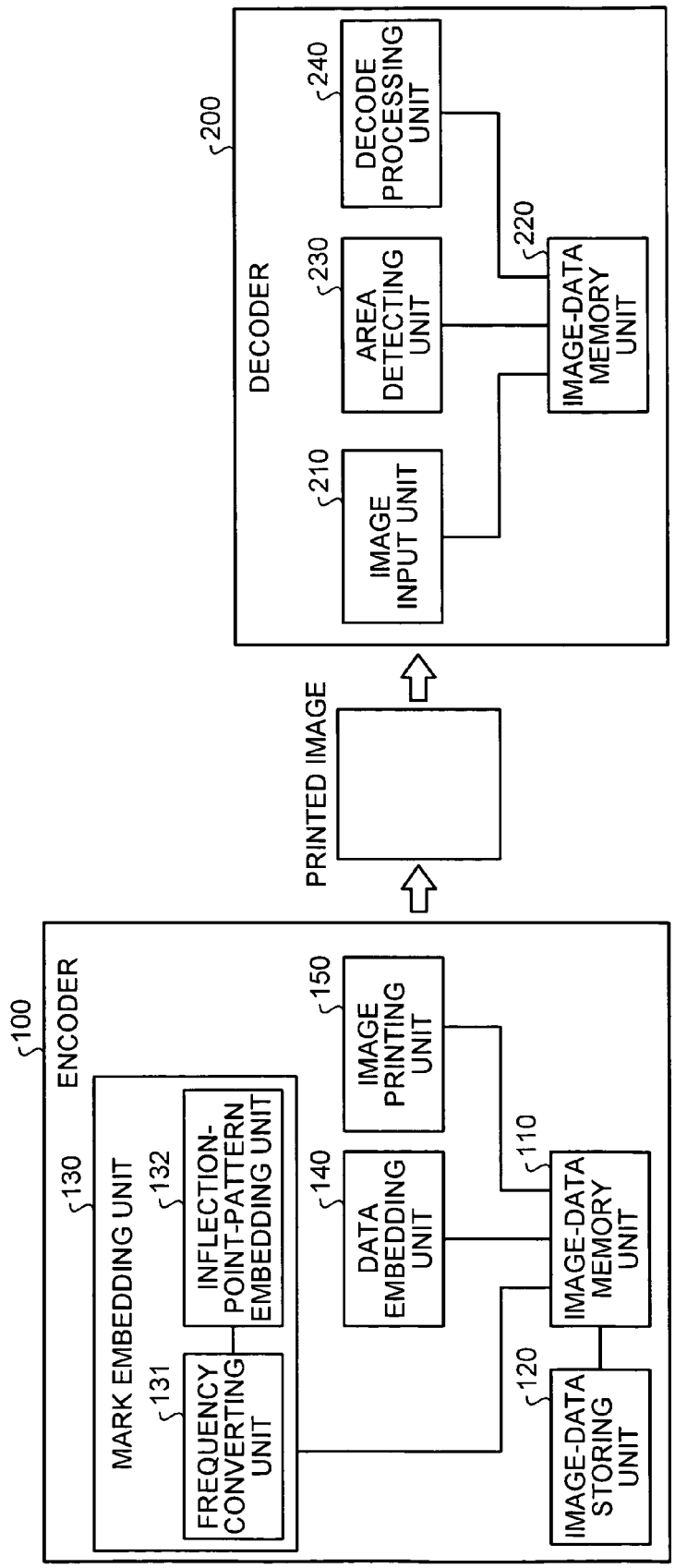
FIG. 2 is a functional block diagram of an encoder and a decoder according to the present embodiment.

FIG. 2 is a functional block diagram of an encoder 100 and a decoder 200 according to the present embodiment. The encoder 100 includes an image-data memory unit 110, an image-data storing unit 120, a mark embedding unit 130, a data embedding unit 140, and an image printing unit 150. The decoder 200 includes an image input unit 210, an image-data memory unit 220, an area detecting unit 230, and a decode processing unit 240.

The image-data memory unit 110 stores data of an image in which the data is embedded. Specifically, the image-data memory unit 110 stores tone levels of R, G, and B for each pixel, and also stores coordinates at which marks are embedded.

The image-data storing unit 120 reads an image from an imaging device, and stores the image data into the image-data memory unit 110. The image-data storing unit 120 can also read image data from an image data file and store the image data into the image-data memory unit 110.

The mark embedding unit 130 embeds marks for specifying a data-embedded area into image data. The mark embedding unit 130 includes a frequency converting unit 131 that frequency-converts a tone level of one of R, G, and B planes, and an inflection-point-pattern embedding unit 132 that changes the tone level so that a frequency-converted result becomes a predetermined pattern of the inflection point.

The data embedding unit 140 embeds data into a data-embedding area specified by marks embedded by the mark embedding unit 130. The data embedding unit 140 reads image data from the image-data memory unit 110, embeds data into the read image data, and stores the embedded result into the image-data memory unit 110.

The image printing unit 150 prints an image which is embedded with data. The image printing unit 150 reads data-embedded image data from the image-data memory unit 110, and prints the image data.

The image input unit 210 picks up a printed image with an imaging device, and inputs the image. The image input unit 210 stores the image data of the input image into the image-data memory unit 220. The image-data memory unit 220 stores the image data of the image input by the image input unit 210.

The area detecting unit 230 detects a data-embedded area. The area detecting unit 230 detects marks embedded into an image by the encoder 100, calculates an enlargement or reduction rate and a rotation angle of the input image using the detected marks, and detects the data-embedded area.

Figure 3:
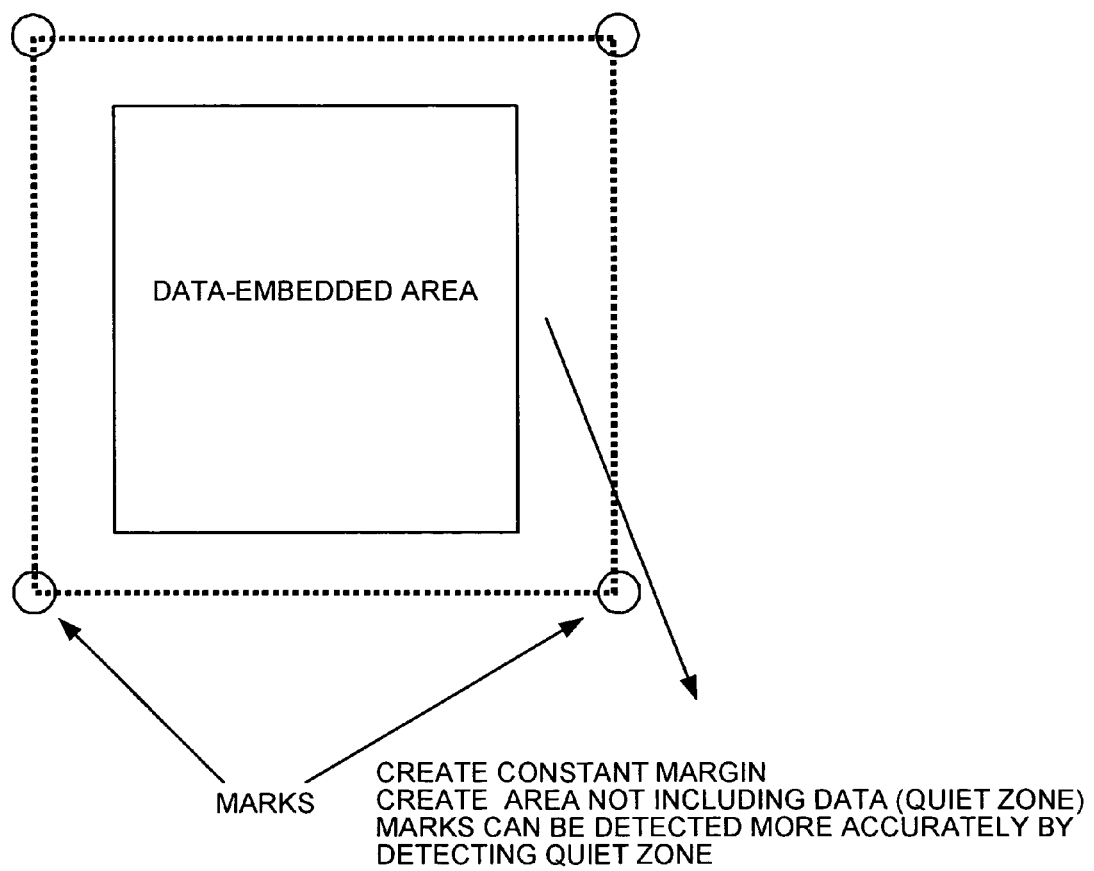
FIG. 3 is a schematic for illustrating a margin between a mark and a data-embedded area.

FIG. 3 is a schematic for illustrating a margin between a mark and a data-embedded area. The mark embedding unit 130 leaves a constant margin between each mark and the data-embedding area, at the time of embedding the marks at corners of a square data-embedded area.

In other words, the mark embedding unit 130 creates an area (a quiet zone) in which no data is included between each mark and the data-embedded area. By providing the quiet zone, the marks can be detected more accurately.

Figure 4:
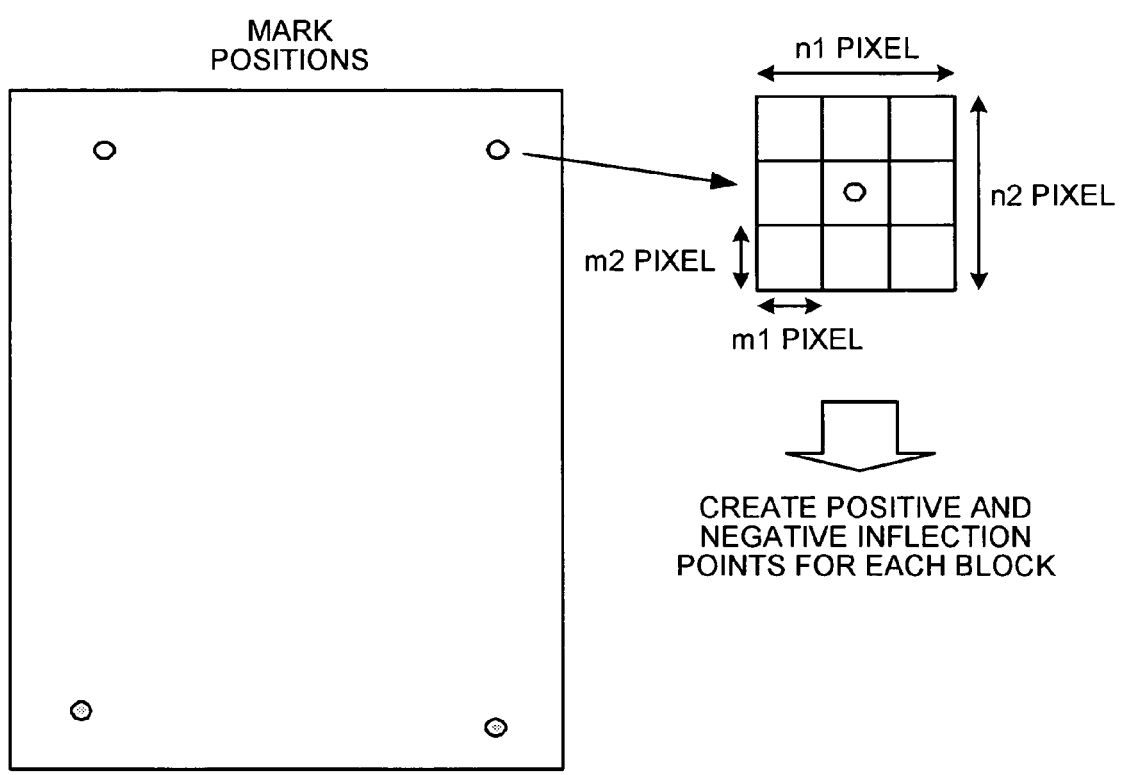
FIG. 4 is a schematic for illustrating an area in which marks are to be embedded.

FIG. 4 is a schematic for illustrating an area in which marks are to be embedded. The area in which the marks are to be embedded is divided into plural blocks. Each block includes plural pixels. In FIG. 4, the total area in which the marks are to be embedded (n1×n2 pixels) is divided into blocks of 3×3. Each block includes m1×m2 pixels. As shown in FIG. 4, the area in which the marks are to be embedded has the layout of blocks each having plural pixels.

Figure 5:
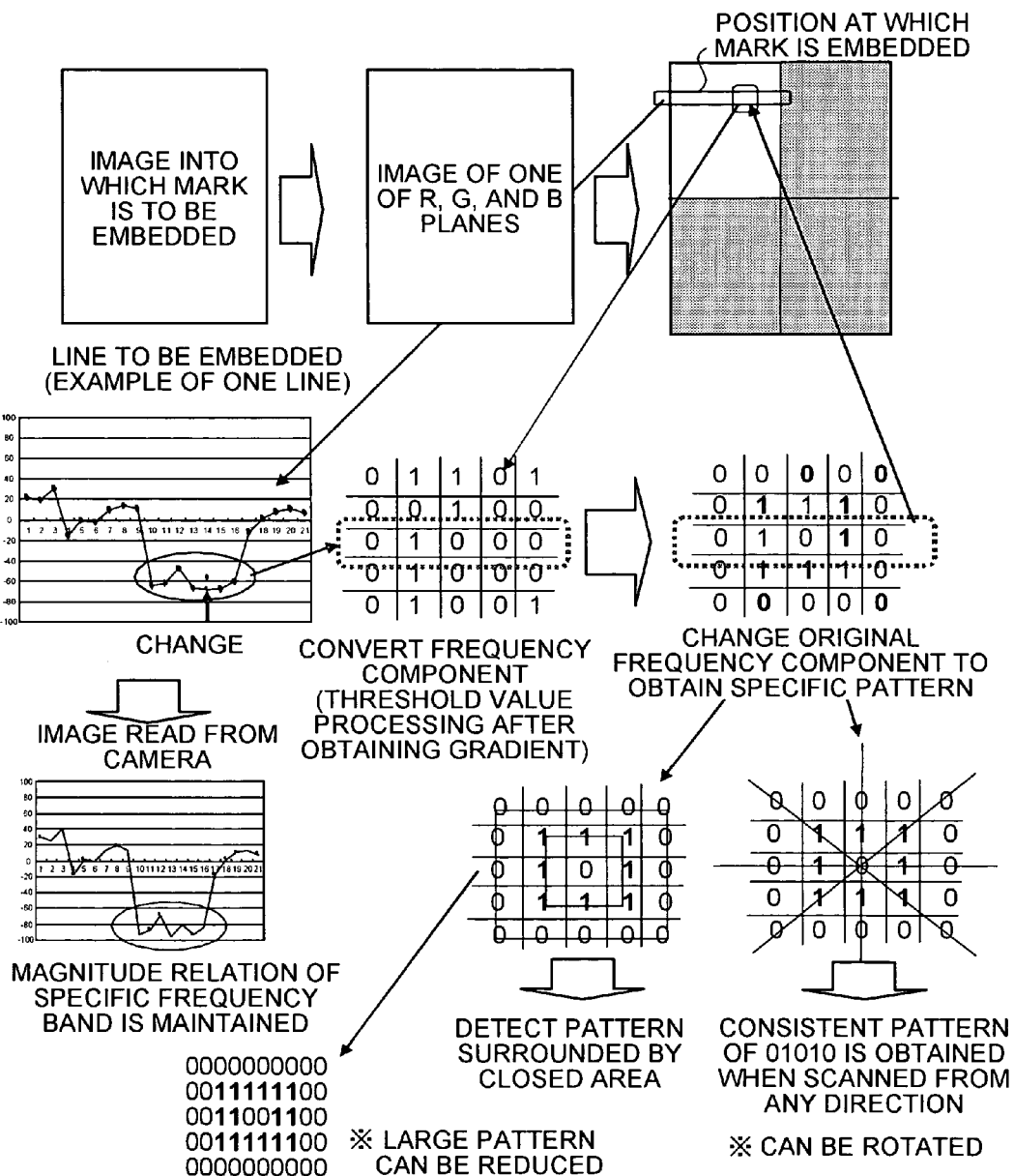
FIG. 5 is a schematic for illustrating an outline of a mark embedding process performed by a mark embedding unit.

FIG. 5 is a schematic for illustrating an outline of a mark embedding process performed by the mark embedding unit 130. The mark embedding unit 130 wavelet transforms a tone level of one of R, G, and B planes from the data of the image into which data is to be embedded, and changes the tone level corresponding to the mark-embedding area of an LL part so that the tone level becomes a predetermined pattern.

For example, assume that a pixel having a tone level smaller than a threshold value is expressed as "0", and a pixel having a tone level equal to or larger than the threshold value is expressed as "1". When a pattern "01010" is obtained based on this assumption, this pattern is assumed as a pattern of the mark. When an actual binary result has a pattern "01000", the mark embedding unit 130 increases a tone level of the fourth pixel "0" to "1". Similarly, the mark embedding unit 130 also changes a pixel tone level of a pattern in other rows so that the pattern of the mark is obtained. With this arrangement, the mark embedding unit 130 can embed the pattern of the mark into the tone levels of the pixel. In FIG. 5, a pattern of five rows and five columns

| 0 | 0 | 0 | 0 | 0 |
|---|---|---|---|---|
| 0 | 1 | 1 | 1 | 0 |
| 0 | 1 | 0 | 1 | 0 |
| 0 | 1 | 1 | 1 | 0 |
| 0 | 0 | 0 | 0 | 0 | is embedded as the mark.

These patterns have a characteristic in that the pattern "01010" can be obtained even when the patterns are scanned from any direction, and that these patterns are rotationally symmetrical. When rotation-symmetrical patterns are used as marks, these marks can be specified accurately even when the image is rotated. When patterns of five rows and ten columns

| 0 | 0 | 0 | 0 | 0 | 0 | 0 | 0 | 0 | 0 |
|---|---|---|---|---|---|---|---|---|---|
| 0 | 0 | 1 | 1 | 1 | 1 | 1 | 1 | 0 | 0 |
| 0 | 0 | 1 | 1 | 0 | 0 | 1 | 1 | 0 | 0 |
| 0 | 0 | 1 | 1 | 1 | 1 | 1 | 1 | 0 | 0 |
| 0 | 0 | 0 | 0 | 0 | 0 | 0 | 0 | 0 | 0 | are used, the pattern "01010" can be accurately specified even when the image is reduced in a lateral direction.

For the sake of convenience, structuring of patterns based on a magnitude relation between a tone level of each pixel and a threshold value has been explained. However, in actual practice, patterns are formed based on an inflection point of tone levels of plural pixels that constitute the blocks. A pattern formed based on an inflection point is explained next.

Figure 6A:
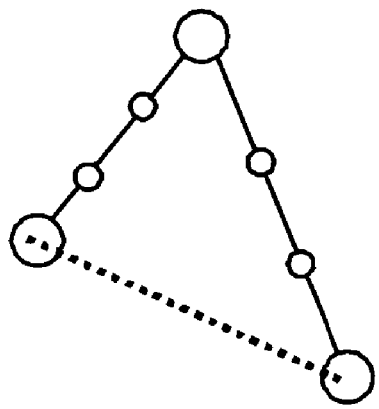
FIGS. 6A to 6D are schematics for illustrating an inflection point.
Figure 6B:
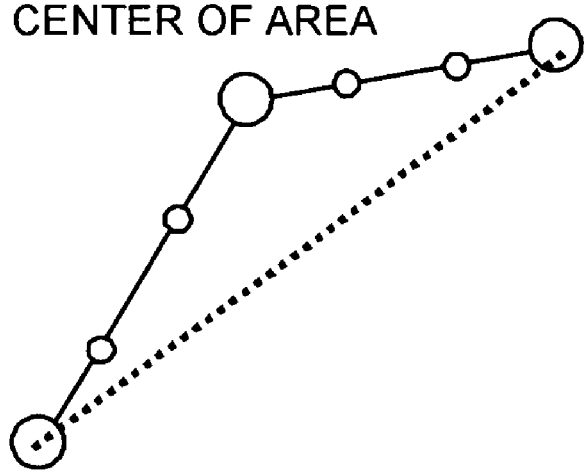
Figure 6C:
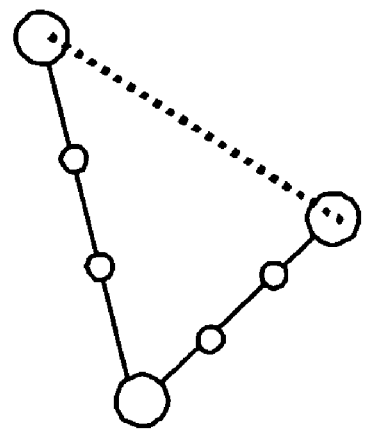
Figure 6D:
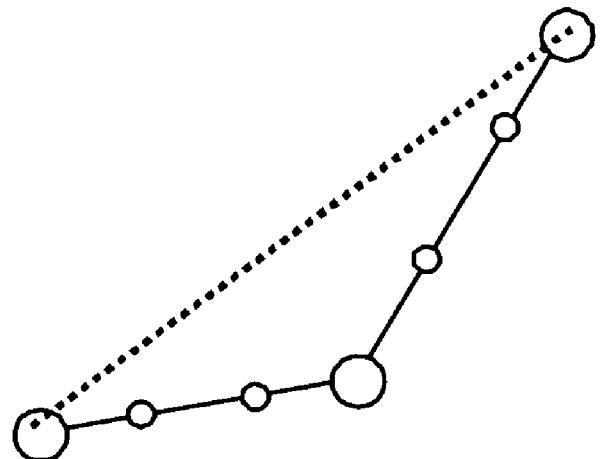

FIGS. 6A to 6D are schematics for illustrating an inflection point. FIGS. 6A and 6B show a negative inflection point having an inflection point projected upward, and FIGS. 6C and 6D show a positive inflection point having an inflection point projected downward.

FIG. 7 is a schematic for illustrating embedding of marks as a symmetrical pattern of the inflection point. When a negative inflection point is black and when a positive inflection point is white, the mark embedding unit 130 embeds a symmetrical pattern of white and black as marks.

The mark embedding unit 130 changes tone levels of pixels according to need, and creates a symmetrical pattern of inflection points as shown in FIG. 7, thereby embedding marks into the image. When a symmetrical pattern to be embedded as marks is symmetrical about a point, other symmetrical patters can be also used.

FIGS. 8A and 8B are schematics for illustrating other symmetrical patterns. FIG. 8A shows the pattern shown in FIG. 7 of which positive and negative and black and white points are inverted. FIG. 8B shows a concentric pattern. The white and black patterns shown in FIG. 7 and FIGS. 8A and 8B correspond to the patterns of "0" and "1" shown in FIG. 5.

FIG. 9 is a flowchart of a processing procedure performed by the mark embedding unit 130. The mark embedding unit 130 reads mark-embedding coordinates from the image-data memory unit 110 (step S101).

Figure 10A:
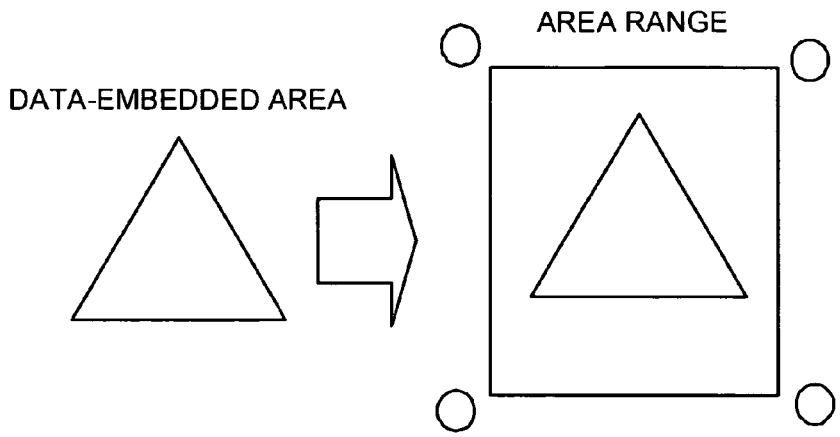
FIGS. 10A to 10C are schematics for illustrating mark-embedding positions according to shapes of data-embedded areas.
Figure 10B:
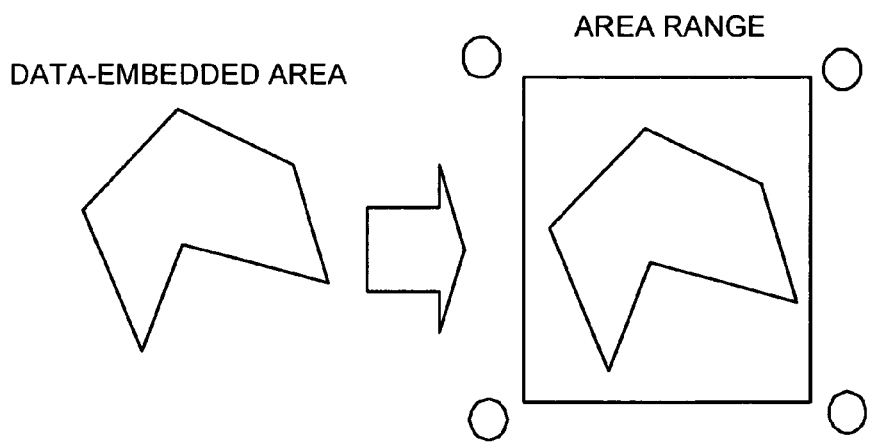
Figure 10C:
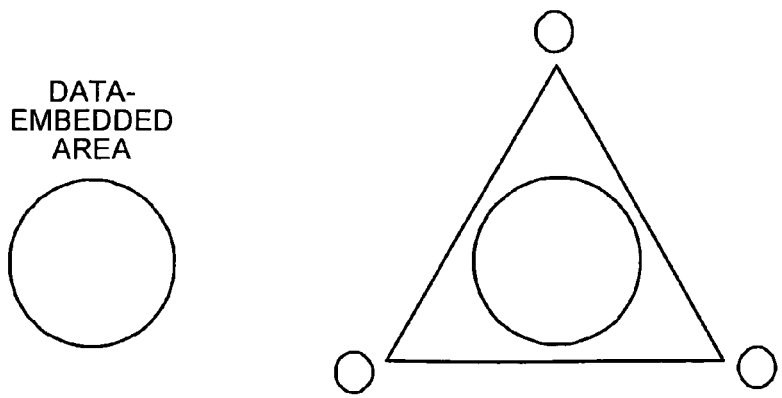

When a data-embedded area does not have a square shape, mark-embedding positions can be determined based on the shape of the data-embedded area. FIGS. 10A to 10C depict mark-embedding positions according to shapes of data-embedded areas.

As shown in FIG. 10A, when a shape of a data-embedded area is triangle, four crests of a rectangle that encircles this triangle are set as positions into which marks are to be embedded. As shown in FIG. 10B, when a shape of a data-embedded area is irregular, four crests of a rectangle that encircles this area are set as positions into which marks are to be embedded. As shown in FIG. 10C, when a shape of a data-embedded area is circle, crests of a triangle that encircles this circle are set as positions into which marks are to be embedded.

The frequency converting unit 131 frequency-converts the tone level (step S102), thereby extracting a band in which embedding is performed. The frequency converting unit 131 performs a wavelet transform as a frequency conversion process.

Figure 11:
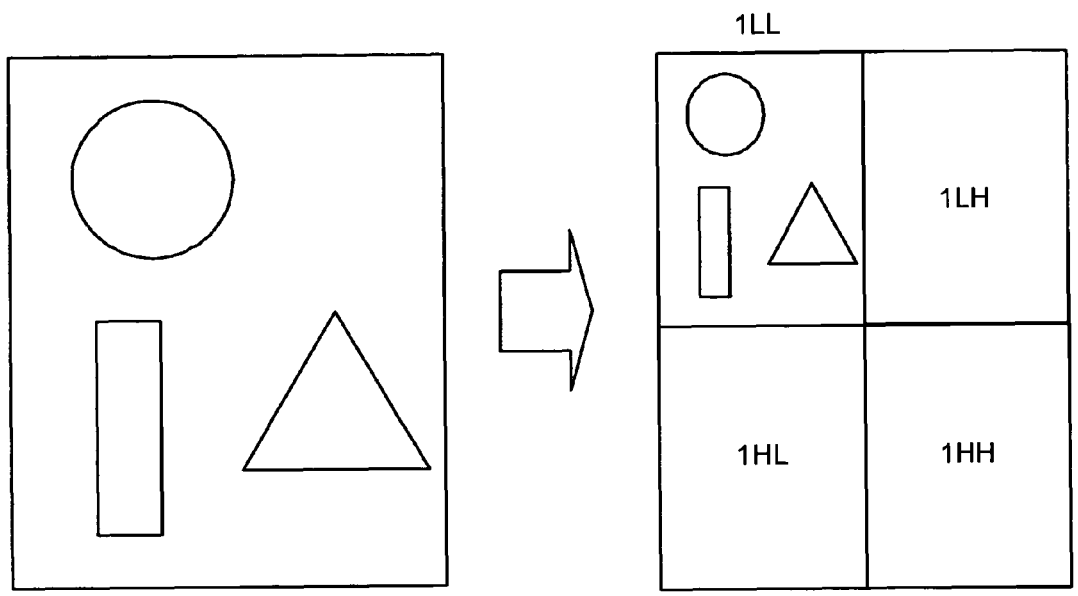
FIG. 11 is a schematic for illustrating a wavelet transform.

FIG. 11 is a schematic for illustrating a wavelet transform. The wavelet transform is performed by dividing an image into four band components of 1LL, 1LH, 1HL, and 1HH. 1LL indicates that wavelet transform is performed once, and includes an L (low frequency) component in the x direction, and an L component in the y direction. 1HH indicates that wavelet transform is performed once, and includes an H (high frequency) component in the x direction, and an H component in the y direction.

A second wavelet transform is performed for the 1LL components. The components of the 1LL are divided into four bands of 2LL, 2LH, 2HL, and 2HH. The wavelet transform is performed plural times until when a band component in which the embedding process is performed is extracted.

While the wavelet transform is used for the frequency conversion process, a band component in which the embedding process is performed can be extracted by executing other process such as a moving average.

The inflection-point-pattern embedding unit 132 embeds marks corresponding to the extracted band component (step S103). The frequency conversion process is performed to check a direction and strength of the inflection point of the area to which the marks are added. The mark embedding process to add values is performed to the original image. In other words, values are not added to frequency-resolved component. Therefore, the frequency conversion process can be an irreversible conversion process.

The frequency converting unit 131 converts the frequency of the tone level, thereby extracting the mark-embedded band. The inflection-point-pattern embedding unit 132 embeds marks into the band component extracted by the frequency converting unit 131 so that a pattern of the inflection point can be formed. With this arrangement, the mark embedding unit 130 can embed marks with minimum image degradation.

Figure 12:
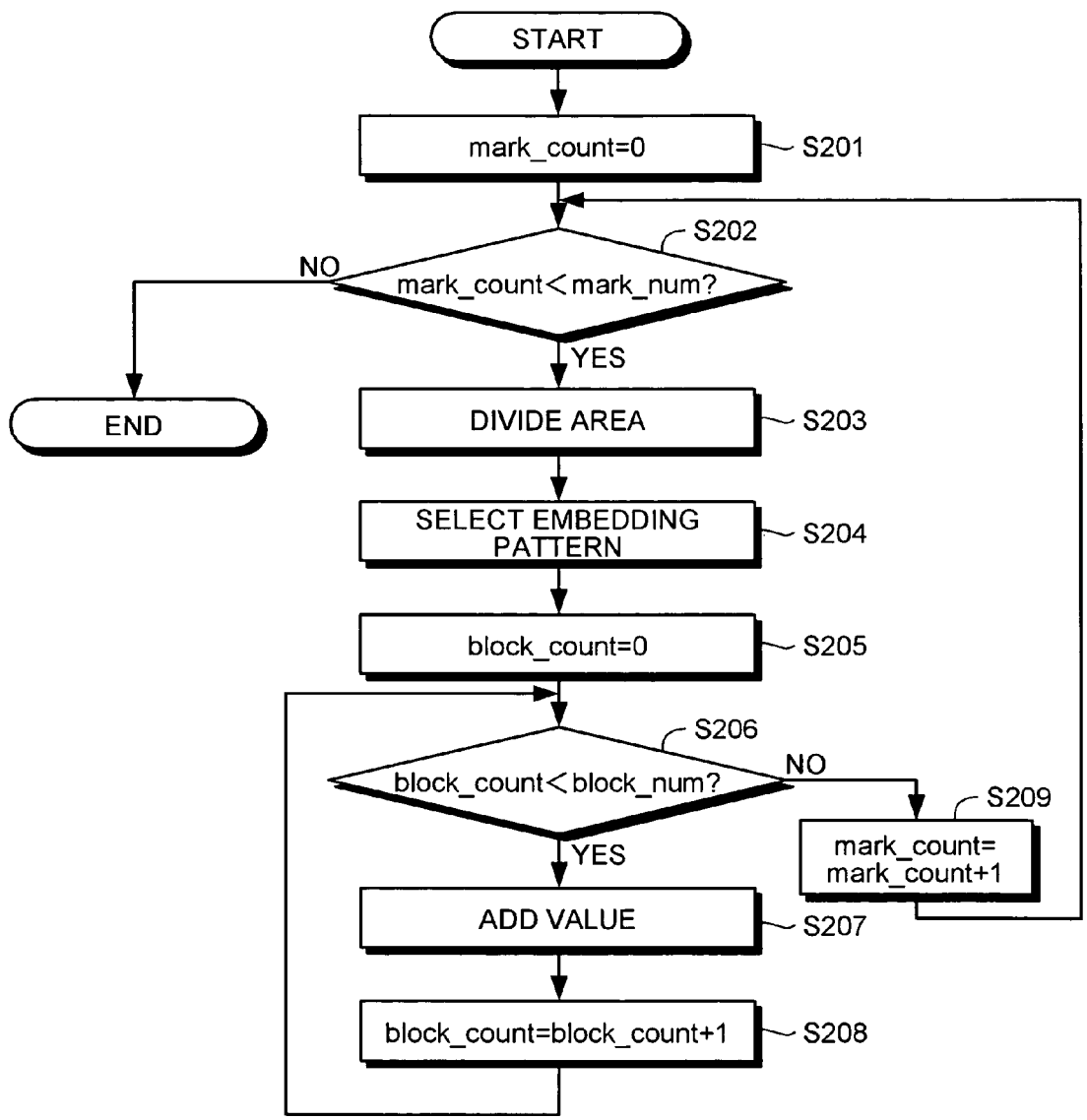
FIG. 12 is a flowchart of a processing procedure for an inflection-point-pattern embedding process performed by an inflection-point-pattern embedding unit.

FIG. 12 is a flowchart of a processing procedure for an inflection-point-pattern embedding process performed by the inflection-point-pattern embedding unit 132.

In the inflection-point-pattern embedding process, the inflection-point-pattern embedding unit 132 initializes mark_count to "0" (step S201). The mark_count represents a variable to count the number of processed marks.

It is determined whether mark_count is smaller than the number of embedded marks, mark_num (step S202). When mark_count is not smaller than mark_num, it means that all marks are embedded, therefore, the process ends.

On the other hand, when mark_count is smaller than mark_num, the area into which marks are embedded is divided into blocks (step S203). The infection point of each block is detected, and an embedding pattern is selected (step S204).

FIG. 13 is a schematic for illustrating a method of detecting an inflection point. The inflection-point-pattern embedding unit 132 calculates differences between the tone level of a pixel at the center of the block and the tone level of each pixel at both ends of the block respectively, and detects an inflection point based on positive or negative of a total of these differences. For example, differences between the tone level of a pixel at the center of the block and the tone level of each pixel at both ends of the block respectively are "10" and "15", and the total of these differences is "25", being positive. Therefore, an inflection point projected upward is detected. In FIG. 13B, differences between the tone level of a pixel at the center of the block and the tone level of each pixel at both ends of the block respectively are "20" and "−5", and the total of these differences is "15", being positive. Therefore, an inflection point projected upward is detected.

An inflection point can be also detected by carrying out differentiation twice within the area of the block. In other words, when a differentiation value is negative twice, the inflection point is projected upward, and when a differentiation value is positive twice, the inflection point is projected downward.

Figure 14A:
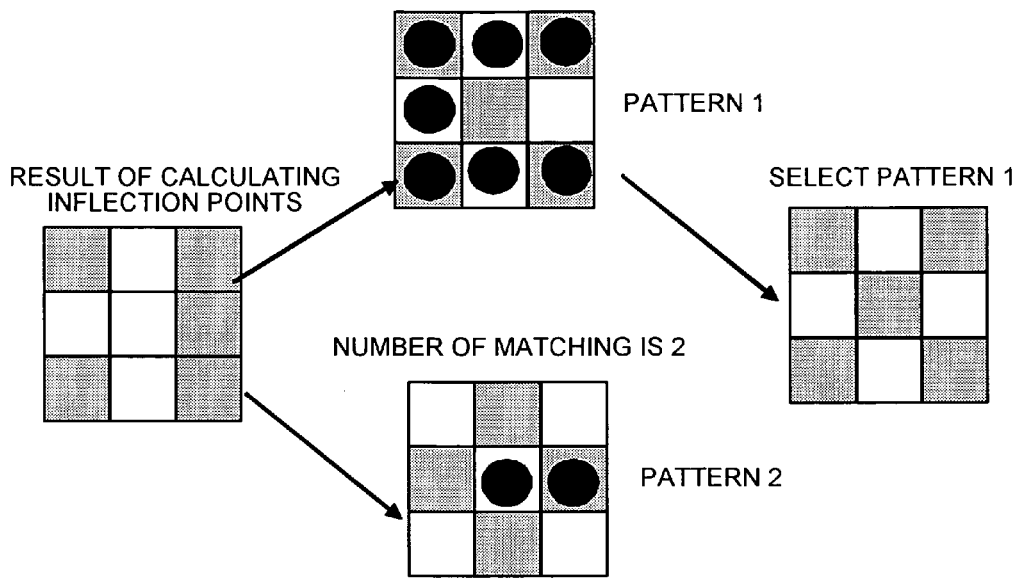
FIGS. 14A and 14B are schematics for illustrating a method of selecting an embedding pattern.
Figure 14B:
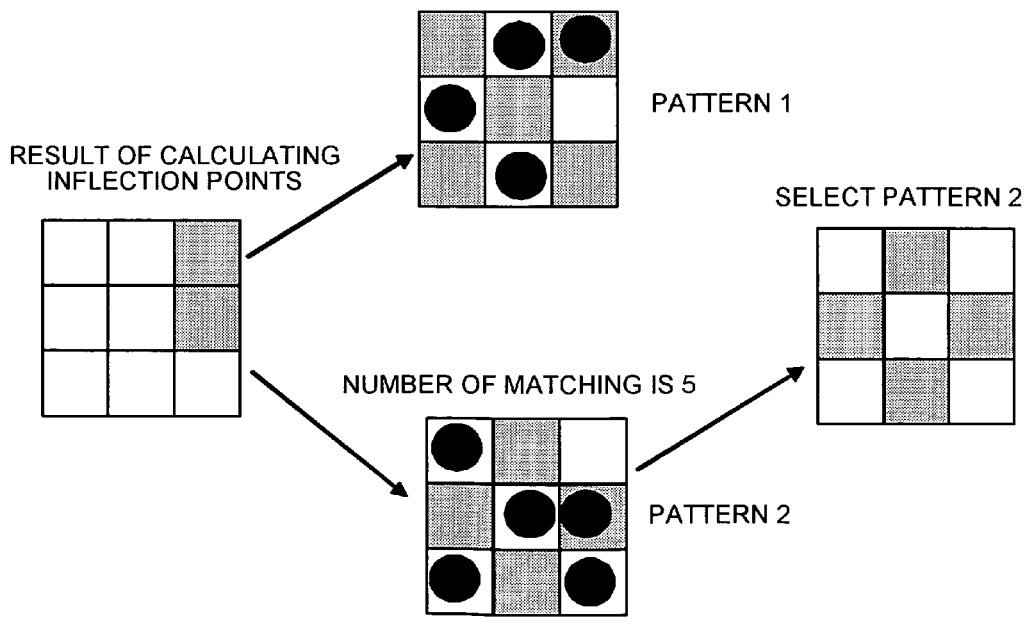

FIGS. 14A and 14B are schematics for illustrating a method of selecting an embedding pattern. The inflection-point-pattern embedding unit 132 compares a result of calculating inflection points with a pattern, and selects a pattern that has a larger number of bocks of which inflection points coincide with the pattern, as an embedding pattern. For example, in FIG. 14A, the number of coincidence between the result of calculating inflection points and a "pattern 1" is "7", and the number of coincidence between the result of calculating inflection points and a "pattern 2" is "2". Therefore, the inflection-point-pattern embedding unit 132 selects the "pattern 1" as an embedding pattern.

The inflection-point-pattern embedding unit 132 initializes the number of variables block_count to count the number of processed blocks (step S205), and determines whether the number of variables block_count is smaller than the number of blocks, block_num (step S206).

As a result, when block_count is smaller than block_num, the inflection-point-pattern embedding unit 132 executes a value adding process to a block that does not coincide with the pattern, to change positive or negative of inflection points (step S207). The inflection-point-pattern embedding unit 132 adds "1" to block_count (step S208), and the process returns to step S206.

On the other hand, when block_count is not smaller than block_num, it means that the process of all blocks have ended, and therefore, "1" is added to mark_count (step S209), and the process returns to step S202.

The inflection-point-pattern embedding unit 132 divides the mark-embedded area into blocks, and changes a tone level of a pixel so that a pattern formed by the inflection points of blocks becomes a predetermined symmetric pattern. With this arrangement, marks can be embedded as a pattern of inflection points.

FIG. 15 is a flowchart of a processing procedure for a value adding process procedure. An embedding level is calculated in the value adding process (step S301). The embedding level is a total of the differences shown in FIG. 13. When detecting inflection points by carrying out differentiation twice in the block area, a differential value of twice at the center becomes the embedding level.

A value is added so that positive and negative of inflection points are inverted exceeding the calculated embedding level (step S302). Specifically, positive and negative of inflection points are inverted by adding a value of a trigonometric function to an original image according to the embedding level.

FIG. 16 is a diagram for explaining an example of creating positive and negative inflection points in a specific frequency component by adding values. The upper graph in FIG. 16 expresses an original image and a specific frequency component. According to this specific frequency component, inflection points are obtained as positive, negative, and negative in this order from the left.

Values are added to the original image so that the inflection points become in the patterns of negative, positive, and negative. To change a positive pattern to a negative pattern at the left side, values are added so that the strength calculated at step S301 is exceeded. To change a negative pattern to a positive pattern, positive values are similarly added to the center. Since the right side originally shows a negative inflection point, no value is added to the right side. As a result, a graph as shown at the lower side of FIG. 16 is obtained. In the specific frequency component of the graph shown at the lower side, the inflection points are negative, positive, and negative from the left in this order.

The inflection-point-pattern embedding unit 132 calculates the embedding level, and adds values to invert positive and negative of inflection points exceeding the calculated embedding level, thereby changing the positive and negative of the inflection points of blocks.

Figure 17:
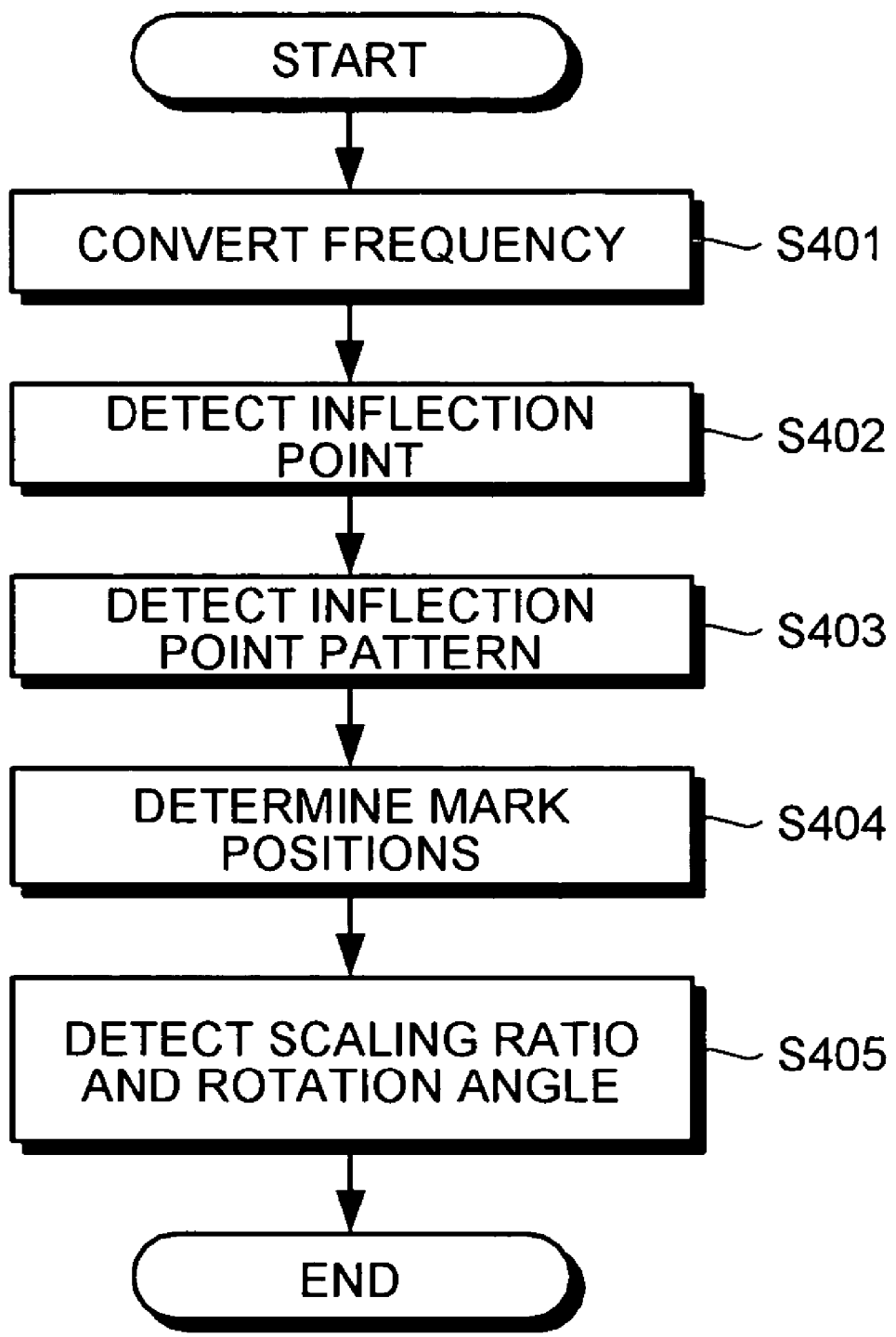
FIG. 17 is a flowchart of a processing procedure for a data embedded-area detecting process performed by an area detecting unit.

FIG. 17 is a flowchart of a processing procedure for a data embedded-area detecting process performed by the area detecting unit 230.

The area detecting unit 230 performs the frequency conversion process in a similar manner to that performed by the frequency converting unit 131 of the encoder 100 using data of a tone level of a pixel stored in the image-data memory unit 220 (step S401). The area detecting unit 230 detects inflection points and inflection point patterns by executing the process similar to that performed by the inflection-point-pattern embedding unit 132 of the encoder 100 (steps S402 and S403).

The area detecting unit 230 determines mark positions based on the detected inflection point patterns (step S404), and detects an enlargement or reduction rate and a rotation angle (step S405).

The area detecting unit 230 of the decoder 200 detects an inflection point pattern using data of an image stored in the image-data memory unit 220, and detects mark positions, an enlargement or reduction rate, and a rotation angle using the detected inflection point pattern, thereby accurately specifying a data-embedded area.

According to the present embodiment, the frequency converting unit 131 of the encoder 100 executes the frequency conversion of the tone level, thereby extracting a mark-embedded band. The inflection-point-pattern embedding unit 132 embeds marks of inflection point patterns into band components extracted by the frequency converting unit 131. With this arrangement, the area detecting unit 230 of the decoder 200 can detect a data-embedded area, an enlargement or reduction rate, and a rotation angle of the image without affecting the visible image, and the decoder 200 can extract data accurately.

Configurations of the encoder and the decoder can be also realized with software to obtain an encoding program and a decode program having functions similar to those of the encoder and the decoder.

Figure 18:
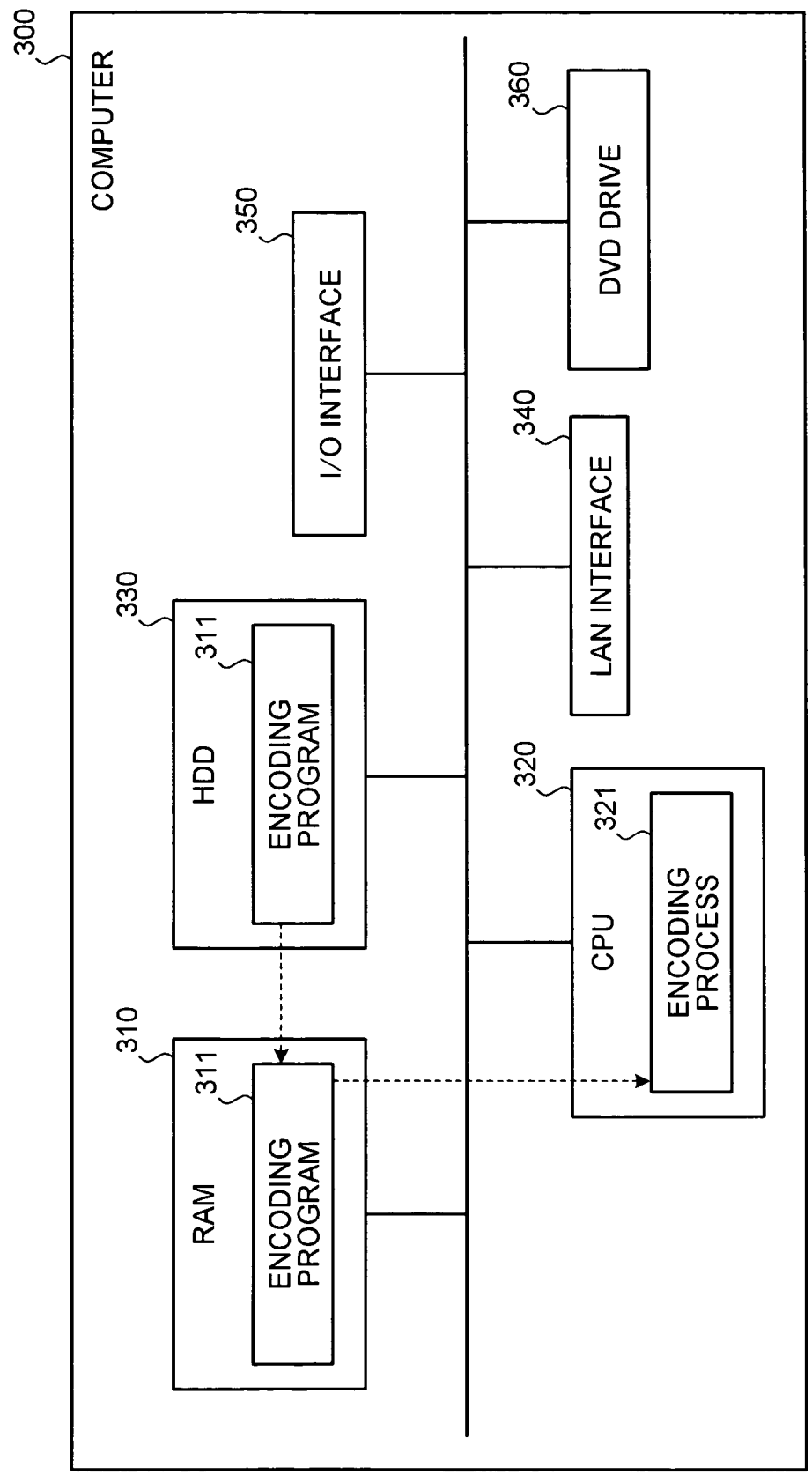
FIG. 18 is a functional block diagram of a computer that executes an encoding program according to the present embodiment.

FIG. 18 is a functional block diagram of a computer that executes an encoding program according to the present embodiment. A computer 300 has a random access memory (RAM) 310., a central processing unit (CPU) 320, a hard disk drive (HDD) 330, a local-area-network (LAN) interface 340, an input and output (I/O) interface 350, and a digital-versatile-disk (DVD) drive 360.

The RAM 310 is a memory that stores a program and an interim result of executing the program. The CPU 320 is a central processing unit that reads the program from the RAM 310, and executes this program.

The HDD 330 is a disk drive that stores a program and data. The LAN interface 340 connects the computer 300 with other computers via a LAN.

The I/O interface 350 connects input and output devices such as a mouse, a keyboard, a display unit, and a printer. The DVD drive 360 reads from and writes into a DVD.

An encoding program 311 executed by the computer 300 is stored into the DVD. The DVD drive 360 reads the encoding program 311 from the DVD, and installs the encoding program into the computer 300.

Alternatively, the encoding program 311 is stored into a database of another computer system connected via the LAN interface 340, and is read from the database and is installed in the computer 300.

The encoding program 311 is stored into the HDD 330, and is read into the RAM 310. The CPU 320 executes this encoding program as an encoding process 321.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus that embeds data in an image, the apparatus comprising:
    a mark embedding unit that embeds a feature that forms a predetermined pattern in the image, as a mark to be used to specify an area in which the data is embedded; and
    a data embedding unit that embeds the data in the image of the area specified by the mark,
    wherein the mark embedding unit embeds a pattern of inflection points into a tone level of a specific color plane, as the mark.

2. The apparatus according to claim 1, wherein
    the predetermined pattern is symmetrical with respect to a point at a center of the pattern in the image.

3. A computer-implemented method of embedding data into an image, the method comprising:
    first embedding a feature that forms a predetermined pattern in the image, as a mark to be used to specify an area in which the data is embedded; and
    second embedding the data in the image of the area specified by the mark,
    wherein the first embedding embeds a pattern of inflection points into a tone level of a specific color plane, as the mark.

4. A computer-readable recording medium that stores a computer program for embedding data in an image, wherein the computer program causes a computer to execute:
    first embedding a feature that forms a predetermined pattern in the image, as a mark to be used to specify an area in which the data is embedded; and
    second embedding the data in the image of the area specified by the mark,
    wherein the first embedding embeds a pattern of inflection points into a tone level of a specific color plane, as the mark.

5. An apparatus that extracts data embedded in an image, the apparatus comprising:
    a mark detecting unit that detects a mark embedded in the image as a predetermined pattern to specify an area in which the data is embedded; and
    a data extracting unit that extracts the data from the area specified based on the mark, wherein
    the mark detecting unit detects a mark that is embedded in a tone level of a specific color plane as a pattern of inflection points.

6. A computer-implemented method of extracting data embedded in an image, comprising:
    detecting a mark embedded in the image as a predetermined pattern to specify an area in which the data is embedded; and
    extracting the data from the area specified based on the mark,
    wherein the detecting detects a mark that is embedded in a tone level of a specific color plane as a pattern of inflection points.

7. A computer-readable recording medium that stores a computer program for extracting data embedded in an image, wherein the computer program causes a computer to execute:
    detecting a mark embedded in the image as a predetermined pattern to specify an area in which data is embedded; and
    extracting the data from the area specified based on the mark,
    wherein the detecting detects a mark that is embedded in a tone level of a specific color plane as a pattern of inflection points.

* * * * *